United States Patent [19]

Baczek et al.

[11] 4,298,697

[45] Nov. 3, 1981

[54] METHOD OF MAKING SHEET OR SHAPED CATION EXCHANGE MEMBRANE

[75] Inventors: Stanley K. Baczek; G. Howard McCain, both of Painesville, Ohio

[73] Assignee: Diamond Shamrock Corporation, Dallas, Tex.

[21] Appl. No.: 87,331

[22] Filed: Oct. 23, 1979

[51] Int. Cl.³ .............................. C08K 5/02; C08J 5/22
[52] U.S. Cl. ....................................... 521/27; 204/296;
        264/232; 264/299; 264/340; 264/343
[58] Field of Search ........................... 521/27; 204/296

[56] References Cited

U.S. PATENT DOCUMENTS 4,007,138  2/1977  Konig ..................................... 521/27
4,148,979  4/1979  Asumi et al. .......................... 521/27
4,189,361  2/1980  Seita et al. ........................... 204/296

Primary Examiner—Joseph L. Schofer
Assistant Examiner—Peter F. Kulkosky
Attorney, Agent, or Firm—John P. Hazzard

[57] ABSTRACT

Normally solid copolymers of a fluorinated vinyl monomer and a perfluorinated vinyl compound having a carboxyl and/or sulfonyl group attached directly to the perfluorinated vinyl group or indirectly through an alkyl or ether linkage have been found to be soluble in low molecular weight polymers of perhalogenated alkyl ethers, low molecular weight polymers of perhalogenated alkyls and perfluoro kerosenes, each of said solvent materials having boiling points between about 200° C. and 350° C. The copolymeric material dissolved in accordance with the instant invention can readily be resolidified by solvent removal and hydrolyzed or converted to the salt form to become a cation exchange material having an equivalent weight in the range of 1000 to 1600.

16 Claims, No Drawings

METHOD OF MAKING SHEET OR SHAPED CATION EXCHANGE MEMBRANE

BACKGROUND OF THE INVENTION

This invention relates to improved methods for the production of sheet or shaped cation exchange copolymers, reinforced and unreinforced, useful as separators in batteries and fuel cells as well as electrochemical cells such as chlor-alkali cells. These materials are also useful in improved method of making acid catalysts.

Typical of the cation exchange copolymers involved in the instant invention are the fluorocarbon vinyl ether polymers disclosed in U.S. Pat. No. 3,282,875. This patent discloses the copolymerization of fluorocarbon vinyl ethers having sulfonyl groups attached thereto with fluorinated vinyl compounds. Of the various copolymers listed in U.S. Pat. No. 3,282,875 is the copolymer produced by the copolymerization of tetrafluoroethylene with perfluoro(3,6-dioxa-4-methyl-7-octene sulfonyl fluoride). This is the base copolymer from which most of the membranes in commercial use today are made.

Another example of cation exchange resins useful in the instant invention are those described in U.S. Pat. No. 3,718,627. The disclosed ion exchange resins are copolymers of tetrafluoroethylene and compounds of the formula $CF_2=CF(CF_2)_nSO_2F$.

After polymerization of either of these materials of the prior art, the copolymer must be hydrolyzed to obtain its ion exchange character. Typically, such materials are treated with caustic to convert the sulfonyl halide group to the alkali metal salt thereof.

These known perfluorocarbon-type cation exchange membranes containing only sulfonic acid groups, however, have been found to have a disadvantage that when used in the electrolysis of an aqueous solution of an alkali metal halide, they tend to permit penetration there through of excessive hydroxyl ions by back migration from the cathode compartment because of the high hydrophilicity of the sulfonic acid group. As a result, the current efficiency during electrolysis at higher caustic concentrations is lower. At extremely high caustic concentrations, the process becomes economically disadvantageous compared to other methods of electrolysis of sodium chloride solutions, such as the mercury or diaphragm process. Many attempts have been made to avoid this disadvantage of lower current efficiency by a number of means. Initially, people in the art attempted to utilize membrane containing fewer sulfonic acid groups, or expressed in another manner, membrane material having a higher equivalent weight. Such lowering of the sulfonic acid group concentration or the increase of the equivalent weight of the membrane does indeed limit the back migration of hydroxyl ions, but results in a serious decrease in the electroconductivity of the membrane and thus, a proportional increase in the power consumption is noted.

A number of solutions of this problem have been attempted in the prior art. Typical of such attempts is the surface modification of the membrane material of the cathode side to attempt to minimize back migration of hydroxyl ions. One such attempt was to laminate to the surface of a membrane of low equivalent weight a thin surface layer of material having a higher equivalent weight so as to minimize back migration. This attempt has not been successful due to the fact that such laminated membranes do not join together well and in operation tend to separate and, in extreme cases, rupture. The laminating technique itself puts much stress on the copolymeric materials in that higher temperatures are required in the calendering of the melt processable copolymer to thin sheets. While the copolymeric material is melt processable, the temperatures at which it flows are very close to the temperatures at which degradation can take place. Thus, melt processable fabrication methods must be tightly controlled and are at best difficult.

Later attempts to improve membrane cells by reducing hydroxyl back migration in, for example, chlor-alkali cells, was to treat the cathode surface of the membrane with an amine whether mono- or diamine or ammonia. Also, to surface modify a sulfonyl membrane to convert the layer facing the cathode to the corresponding carboxylic material. Typical of this method is that described in U.S. Pat. No. 4,151,053, incorporated herein by reference.

The manufacture of thin sheets of the copolymeric materials of the instant invention in the past have been as expressed previously very tedious. The copolymeric material would be melted and calendered to the required thickness. In cases where reinforcing fabric was included with the sheet of membrane, the problems were further increased because the flowability of the copolymeric material at processing temperatures is limited and if the temperatures are raised further to improve the flowability, the polymeric material degrades. In almost all cases, the membrane materials must be reinforced so as to be sufficiently rugged to be economically advantageous in the uses envisioned. Typical of the problems encountered in preparing fabric reinforced sheet membranes can be found in U.S. Pat. No. 4,147,844.

BRIEF SUMMARY OF THE INVENTION

Highly fluorinated cation exchange materials containing sulfonyl and carboxyl groups have been widely used in various industries. For example, such materials are used in chlor-alkali membrane cells and as acid catalysts. The highly fluorinated nature of these products has resulted in numerous processing problems since at the equivalent weight range in which such materials have been found to be useful as cation exchange materials the polymers were insoluble prior to the instant invention. By the process of the instant invention it has been found that the precursor resin to the cation exchange materials, that is, the copolymeric material containing sulfonyl fluoride, carbonyl fluoride, sulfonate esters, or carboxylate ester, can be dissolved in a solvent selected from the group consisting of low molecular weight polymers of perhalogenated alkyl ethers, low molecular weight polymers of perhalogenated alkyls, and perfluoro kerosenes, each of said solvents having boiling points between about 200° C. and 350° C. This precursor to the polymer containing ion exchange sites is referred to in the instant specification as the intermediate polymer. The dissolution of such intermediate polymer with high solvent loading readily permits many easily controlled processing techniques which result in more uniform end products formed from the intermediate polymer. For example, such solvent technique can employ spraying, dipping, rolling, painting and other coating techniques to produce uniform coatings or sheets of the intermediate polymer. Likewise, laminar products containing different equivalent weight intermediate polymer can be utilized as well as laminar products containing different intermediate resins and/or different cation exchange groups.

DETAILED DESCRIPTION OF THE INVENTION

Copolymeric ion exchange materials are well known in the art. Typically, these are highly fluorinated resins containing sulfonic acid or carboxylic acid groups or salts thereof attached to the copolymer. The range of equivalent weights, i.e., the weight of resin/mole of cation exchange groups in said resin, found to be useful are generally in the range of 1000 to 1600. These highly fluorinated materials in this equivalent weight range however are extremely difficult to process since the highly fluorinated nature makes them somewhat akin to polytetrafluoroethylene which requires special processing techniques. The cation exchange materials are not processed in the ionic form, but rather in the precursor form referred to in this application as the intermediate polymer. By intermediate polymer is meant the form of the copolymeric resin before it is converted to the ionic form. In the intermediate form, the sulfonyl portion of the molecule is in the sulfonyl fluoride or sulfonate ester form. If the carboxyl group is present, it can be in the carbonyl fluoride or carboxylate ester form. This precursor or intermediate resin is thermoplastic or melt processable and, thus, prior art techiques for shaping and forming sheets or other shaped forms involved hot pressing, calendering, molding or the like techniques to bond individual particles of intermediate polymer together to result in the desired form or shape of material. The degree of freedom in such processing is extremely limited since the resulting material is quite heat sensitive and overheating in the forming step can, in fact, decrease the utility of the resulting cation exchange material.

Further difficulties in processing the materials of the prior art are encountered when it is desired to reinforce intermediate polymer with a fabric or the like. Typical such methods are described in U.S. Pat. No. 3,925,135.

By the discovery of the solvent for the intermediate polymer in the present invention, such processing difficulties are overcome and sheets of any size or laminates of any size can be readily made without highly specialized equipment, merely by casting, painting, dipping, or other standard coating techniques, followed by removal of the solvent by heat, vacuum and/or solvent stripping techniques followed by removal of the solvent, by heat, vacuum and/or solvent stripping tehcniques. The dimensions of the so-produced film or reinforced film or other shape can be closely controlled.

The intermediate polymer which serves as the precursor to the polymer containing ion exchange sites is prepared from monomers which are fluorine-substituted vinyl compounds. The polymers include those made from at least two monomers with at least one of the monomers coming from each of the two groups described below. The first group comprises fluorinated vinyl compounds such as vinyl fluoride, hexafluoropropylene, vinylidene fluoride, trifluoroethylene, chlorotrifluoroethylene, perfluoro (alkyl vinyl ether), tetrafluoroethylene and mixtures thereof.

The second group includes monomers containing or capable of being converted to cation exchange materials containing pendant sulfonic acid, carboxylic acid and less desirably phosphoric acid groups. Esters or salts which are capable of forming the same ion exchange groups can also be utilized. Furthermore, the monomers of the second group can also contain a functional group in which an ion exchange group can be introduced and would include such groups as oxyacids, salts, or esters of carbon, nitrogen, silicon, phosphorus, sulfur, chlorine, arsenic, selenium, or tellurium.

One of the preferred family of monomers in the second group is the sulfonyl containing monomers containing the precursor —$SO_2F$ or —$SO_3$ alkyl. One example of such a comonomer is $CF_2=CFSO_2F$. Additional examples can be represented by the generic formula $CF_2=CFR_fSO_2F$ wherein $R_f$ is a bifunctional perfluorinated radical comprising 2 to 8 carbon atoms. The particular chemical content or structure of the radical linking the sulfonyl group to the copolymer chain is not critical and may have fluorine, chlorine or hydrogen atoms attached to the carbon atom to which is attached the sulfonyl group, although the carbon atom must have at least one fluorine atom attached. If the sulfonyl group is attached directly to the chain, the carbon in the chain to which it is attached must have a fluorine atom attached to it. The $R_f$ radical of the formula above can be either branched or unbranched, i.e., straight chained and can have one or more ether linkages. It is preferred that the vinyl radical in this group of sulfonyl fluoride containing comonomers be joined to the $R_f$ group through an ether linkage, i.e., that the comonomer be of the formula $CF_2=CFOR_fSO_2F$. Illustrative of such sulfonyl fluoride containing comonomers

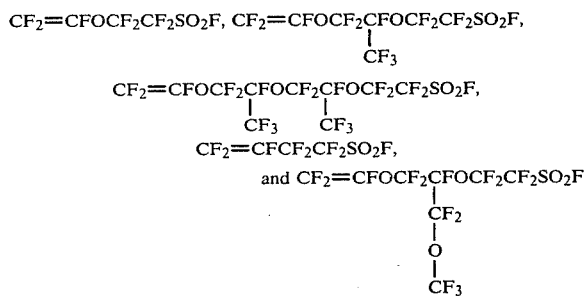

The most preferred sulfonyl fluoride containing comonomer is perfluoro(3,6-dioxa-4-methyl-7-octenesulfonyl fluoride).

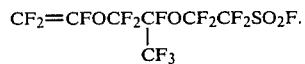

The sulfonyl containing monomers are disclosed in such references as U.S. Pat. No. 3,282,875 to Connolly et al. and U.S. Pat. No. 3,041,317 to Gibbs et al, U.S. Pat. No. 3,560,568 to Resnick and U.S. Pat. No. 3,718,627 to Grot.

The preferred intermediate copolymers are perfluorocarbon, i.e., perfluorinated, although others can be utilized as long as there is a fluorine atom attached to the carbon atom which is attached to the sulfonyl group of the polymer. The most preferred copolymer is a copolymer of tetrafluoromethylene and perfluoro(3,6-dioxa-4-methyl-7-octenesulfonyl fluoride) which comprises 10 to 60 percent, preferably 25 to 50 percent by weight of the latter.

The intermediate copolymer is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, to Gibbs et al. by the polymerization of the major monomer therein, such as tetrafluoroethylene, and a fluorinated ethylene containing sulfonyl fluoride in the presence of a free radical initiator, preferably a perfluorocarbon peroxide or azo compound, at a temperature in the range of 0°–200° C. and at pressures in the range 1–200 or more atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, 1,1,2-trichlorotrifluoroethane, perfluorooctane, perfluorobenzene, and the like.

Aqueous techniques for preparing the intermediate copolymer include contacting the monomers with an aqueous medium containing a free-radical initiator to obtain a slurry of polymer particles in non-water-wet or granular form, as disclosed in U.S. Pat. No. 2,393,967 to Brubaker, contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752 to Berry and U.S. Pat. No. 2,593,583 to Lontz.

Transformation of the intermediate polymer to a polymer containing ion exchange sites is by conversion of the sulfonyl groups ($—SO_2F$ or $—SO_3$ alkyl) to $SO_3X$, where X=hydrogen or alkali metal. The converted polymer is a fluorine containing polymer with a plurality of sulfonate groups present as ion exchange sites. These ion exchange sites will be contained in side chains of the polymer and will be attached to individual carbon atoms to which are attached at least one fluorine atom. The conversion of the sulfonyl groups in the intermediate polymer to ion exchange sites may be in accordance with known techniques in the prior art, e.g., U.S. Pat. No. 3,770,567 to Grot and U.S. Pat. No. 3,784,399 to Grot.

Another preferred family of monomers of the second group is the carboxyl containing monomers of the structure referred to previously in discussing the sulfonyl monomers wherein the carboxyl group replaces the sulfonyl group. Often, the final copolymer contains one less carbon atom than the corresponding sulfonyl copolymer due to conversion process such as discussed in U.S. Pat. No. 4,151,053 (See Column 7, lines 37–64). Particularly preferred monomers in this group include $CF_2=CF-O-CF_2CF(CF_3)O(CF_2)_2COOCH_3$ and
$CF_2=CF-O-CF_2CF(CF_3)OCF_2COOCH_3$ Such monomers can be made in accordance with the teachings found in U.S. Pat. No. 4,151,053 or Japanese Published Patent Application 52(1977) 38486. Methods of copolymerization are likewise disclosed therein.

The preferred soluble copolymer of the present invention is one which comprises 10–60%, more preferably 25–40% by weight of the second monomer so as to yield equivalent weights in the range of 1000 to 1600 or most preferably in the range of 1000–1300.

The soluble fluoropolymer of the instant invention is also characterized by the presence of the carboxyl and/or sulfonyl groups represented by the formula:

$—OCF_2CF_2X$ and/or
$—OCF_2CF_2Y-O-YCF_2CF_2O—$ wherein X is sulfonyl fluoride, carbonyl fluoride, sulfonate ester, or carboxylate ester and Y is sulfonyl ($—SO_2—$) or carbonyl ($—CO—$).

The aforedescribed intermediate polymer can be dissolved only by use of the specific solvents disclosed hereinafter.

The solvents useful in the present invention are low molecular weight polymers of perhalogenated alkyls and/or perhalogenated alkylethers having boiling points in the range of 200° C. to 350° C. Particularly preferred are the oligomers or telomers of chlorotrifluoroethylene, $—(CF_2-CFCl)_n—$ wherein n is 5 to 15 having boiling points between about 200° C. and 350° C., and perfluorokerosenes having boiling points between about 200° C. and 350° C.

Typical perhalogenated alkyl solvents available commercially are the "Halocarbon Oils" sold by Halocarbon Products Corp., Hackensack, N.J. Particularly preferred of these saturated low molecular weight polymers of chlorotrifluoroethylene are Halocarbon oil 11–14 and Halocarbon Oil 11–21. Similar solvents useful in the instant invention are the FLUOROLUBES ® sold by Hooker Chemical Corporation, Niagara Falls, N.Y. Preferred among the FLUOROLUBES ® are Fluorolube FS-5 and MO-10.

Ugine Kuhlmann of Paris, France also offers low molecular weight polymers of chlorotrifluroethyelene in their Voltalef ® oil line. A typical solvent from this company useful in the present invention would be Voltalef ® 10-S.

Typical examples of the solutions of the instant invention are as follows:

EXAMPLE 1

A solution composed of 56 g of 1200EW intermediate resin and 66 g of 1105 EW intermediate resin in a mixture of 425 g of Halocarbon Oil 11-21 and 59 g of Halocarbon Oil 11-14 was prepared by heating 245° C. in a rectangular glass tank immersed in a fluidized sand bath. The intermediate resin was a copolymer of tetrafluoroethylene and perfluoro(3,6-dioxa-4-methyl-7 octensesulfonyl fluoride). Into this clear, gel-free solution was dipped a 10×10 cm square of Teflon T-26C cloth obtained from E. I. duPont de Nemours & Co., Inc.) with a dwell time of 5 sec.

The resulting reinforced membrane was soaked overnight in methylene chloride, air dried for 5–6 hours, then the drying completed in an oven over a 20 hour period, the temperature being slowly raised from 100° C. to 120° C., at which point the polymer became transparent, and had an approximate 4-mil window thickness. One side of this reinforced membrane was blanked off with 5-mil Teflon film and the membrane/frame assembly was redipped in a carboxyl-type intermediate resin solution. The carboxyl-type intermediate resin solution was made as follows: 122 grams of tetrafluoroethylene/$CF_2=CFOCF_2CF(CF_3)OCF_2CF_2CO_2CH_3$ copolymer having an equivalent weight of approximately 1050 was dissolved in a mixture of 429 grams of Halocarbon Oil 11-21 and 59 grams of Halocarbon oil 11–14, contained in a rectangular reservoir immersed in a fluidized sand bath at 225° C. This dipping, had a 5 second dwell time. After drying at 225° C. for 15 minutes, the membrane had an additional thickness of about 4 mils. After hydrolysis with potassium hydroxide in aqueous dimethyl sulfoxide, the film was used as a separator in a two-compartment laboratory electrolytic cell (active area three square inches) with the carboxy side facing the cathode. Under standard operating conditions of 90° C. and 2 amps per square inch current density, the cell produced sodium hydroxide at a concentration of 444 grams per liter, with a current efficiency of 82.9 percent, with the cell potential of 4.83 volts.

EXAMPLE 2

A 10×10 cm. square piece of commercial T-26C reinforced 5-mil, 1100 equivalent weight Nafion sheet, available from E. I. duPont de Nemours and Company, in the potassium sulfonate form, was mounted in a 10×10 steel frame with one side blanked off by means of a 5-mil Teflon film. The mounted sheet was dipped in the carboxy intermediate resin of Example 1 above at 225° C., using a 10 second dwell time. After drying at 225° C. for 15 minutes, the membrane had an additional thickness of about 2 mils. After hydrolysis with potassium hydroxide in aqueous dimethyl sulfoxide, the nearly black film was used as a separator in the electrolyzer of Example 1 above, with the carboxy side facing the cathode. Under standard operating conditions of 90° C. and 2 amps per square inch current density, the cell produced sodium hydroxide at 442 grams per liter concentration with a 92.2 percent current efficiency at 4.03 volts cell potential.

EXAMPLE 3

A 10×10 cm. square of T-900 cloth (a tightly woven material composed of Teflon fiber interspersed with rayon fibers obtained from E. I. duPont de Nemours and Company) mounted in a 10×10 cm steel frame, was dipped in a solution of 61 grams of 1200 equivalent weight of intermediate resin of Example 1 above, dissolved in a mixture of 232 grams Halocarbon Oil 11–21 and 314 grams of Fluorolube FS-5. The solution temperature was 247° C. and the dwell time was 30 seconds during the dipping of the T-900 cloth. The membrane was processed, after being allowed to cool, by soaking overnight in methylene chloride, then air dried for 5–6 hours, followed by completing the drying in an oven over a 20 hour period, the temperature being slowly raised from 100° C. to 120° C., at which point the polymer became transparent. This sample was then reacted on one side with ethylene diamine under conditions giving a sulfonamide layer about 1 mil thick. This EDA-treated membrane was hydrolyzed by exposure to 10 percent sodium hydroxide in aqueous dimethyl sulfoxide at 90° C. for three hours, and finally mounted as a separator in a two compartment laboratory electrolytic cell having an active area of three square inches with the diamine treated side facing the cathode. The cell was then used to electrolyze aqueous sodium chloride and under standard operating conditions of 90° C. and 2 amps per square inch current density, the cell produced 300 grams per liter sodium hydroxide at a current efficiency of 71.3 percent at a cell potential of 4.86 volts.

EXAMPLE 4

A 10×10 cm square of T-900 cloth mounted in a 10×10 steel frame was dipped in a solution containing 61 grams of carboxy intermediate resin, this intermediate resin being a copolymer of tetrafluoroethylene and $CF_2=CFOCF_2CF(CF_3)OCF_2CF_2CO_2CH_3$, having an equivalent weight of 1125 dissolved in a mixture of 483 grams of Halocarbon Oil 11–21 and 66 grams Halocarbon Oil 11–14. The solution temperature was 225° C. and the dwell time was approximately 5 seconds. The membrane was dried at 225° C. in a mechanical convection oven and the dipping/drying process repeated twice more for a total of three dips. After saponification in potassium hydroxide dissolved in aqueous dimethyl sulfoxide, it was placed in the electrolytic cell of the previous Examples. Under standard conditions of 90° C. operation at 2 amps per square inch current density, the cell produced 385 grams per liter of sodium hydroxide at a current efficiency of approximately 85 percent with a cell potential of 4.97 volts.

EXAMPLE 5

A 10×10 cm sheet of Pellon AC-1833 (a non-woven polyamide fabric manufactured by Pellon Corporation) was mounted in a 10×10 cm steel frame and dipped in the intermediate resin solution of Example 3 above at 238° C., with a 30 second dwell time. The coated sheet was soaked overnight in methylene chloride, air dried for 5–6 hours, then the drying completed in an oven over a 20 hour period, the temperature being slowly raised from 100° C. to 120° C., at which point the polymer became transparent. After hydrolyzing the membrane by exposure to 10 percent sodium hydroxide in aqueous dimethyl sulfoxide at 90° C. for 3 hours, the membrane was mounted as a separator in a two compartment laboratory electrolytic cell having an active surface area of three square inches. Under standard operating conditions of 90° C. and 2 amps per square inch current density, the cell produced 346 grams per liter sodium hydroxide at a current efficiency of in excess of 85 percent and a cell potential of 3.57 volts.

EXAMPLE 6

A 10×12 cm sheet of Pellon 1531D (a viscose rayon non-woven fabric manufactured by Pellon Corporation) was dipped in a solution of 91.5 grams of 1200 equivalent weight intermediate resin which was a copolymer of tetrafluoroethylene and perfluoro(3,6-dioxa-4-methyl-7octenesulfonyl fluoride) in a mixture of 467 grams Halocarbon Oil 11–14 and 52 grams Halocarbon Oil 11–21. The solution temperature was 237° C., and dwell time for the dipping was 5 seconds. The reinforced membrane was soaked overnight in methylene chloride, air dried for 5–6 hours, then the drying completed in an oven over a 20 hour period, the temperature being slowly raised from 100° C. to 120° C., at which point the polymer became transparent. The resulting sheet was then treated on one side with ethylene diamine and hydrolyzed with potassium hydroxide in aqueous dimethyl sulfoxide. When this sheet was mounted as a separator in the electrolytic test cell of the previous Examples with the ethylene diamine treated side facing the cathode, the cell produced 461 grams per liter sodium hydroxide at 76.7 percent current efficiency with a cell potential of 5.71 volts under standard conditions of 90° C., operation at 2 amps per square inch current density.

The solvents of the instant invention are capable of dissolving completely the intermediate polymer up to about 30 weight percent depending on equivalent weight when the intermediate polymer is in the sulfonyl fluoride, sulfonyl chloride, sulfonate ester or carboxyl ester form. In making up the solutions, normally the appropriate amount of intermediate polymer and solvent are mixed and heated to temperatures below the boiling point of the solvent. Typically, the heating is usually done to temperatures in the range of 220° C. to 260° C. Using these temperatures, total dissolution of the intermediate polymer takes place anywhere up to 24 hours, depending upon equivalent weight, temperature, degree of polymer loading and agitation. Once in solution, the intermediate polymer may be cast to form membranes of any possible dimension and returned to the solid state merely by stripping of the solvent. Fabric reinforcement such as Teflon fabrics of various weave, degrees of openness and surface preparations can also be encapsulated in the same manner resulting in a stress-free, reinforced membrane of closely controlled uniform thickness. Also, such reinforcing fabrics can be dipped into these hot solutions of dissolved intermediate polymer. Multiple dippings can be used if thicker membranes are desired. This dipping technique into the hot intermediate polymer solutions can use mandrel, frame, continuous roll coating techniques, or other methods known to those familiar with the art. Excess solution is allowed to drip from the coated material and excess solvent exudes from the material. The coated reinforcing cloth may then be dipped into methylene chloride or other given solvent for the preferred chlorotrifluoroethylene telomer solvent, and after a period of time, removed and allowed to dry in air and then placed in an oven for thermal treatment. The thermal treatment is for the purpose of removing any remaining methylene chloride and we have found that treatment at 100° C. for four hours followed by a slow temperature rise over approximately a three-hour period to 120° C. is completely satisfactory. The previously discussed extraction method using methylene chloride is most useful in the systems wherein the intermediate polymer is in the sulfonyl halide form. If the intermediate polymer is in the carboxyl ester form, no extraction is necessary and the resulting film or reinforced membrane may be cured directly by heating at 225° C. for a very short time, as for example, one to 15 minutes. Prior to the heating, the film or reinforced membrane is cloudy, due to the inclusion of solvent. However, after the heating, the film cloudiness disappears.

Asymmetric membranes may also be prepared by the abovedescribed techniques, such as by multiple dipping. Thus, various equivalent weight laminates and asymmetric carboxylic/sulfonate or sulfonamide laminates may be prepared. In many cases, it is preferred to use multiple dipping or coating techniques to ensure against pinholes in the film or reinforced membranes. When utilizing a multiple coating technique, purification of the surface between coatings may be utilized if desired. Purification of the surface can be made using Freon-type solvents, but such purification is not necessary.

The preferred loading of the solutions of the instant invention are those that contain from 1 to 30 weight percent intermediate polymer, as these are easily used in most forming techniques.

What is claimed is:

1. A method of forming shaped polymeric material polymerized from at least two monomers, one said monomer consisting essentially of at least one fluorinated vinyl compound and said other monomer consisting essentially of at least one monomer of the structure

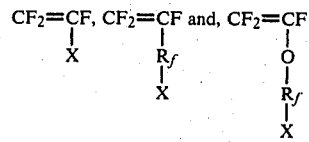

wherein $R_f$ is a bifunctional perfluorinated radical containing from two to eight carbon atoms, which carbon atoms may be interrupted by one or more oxygen atoms and X is selected from the group consisting of sulfonyl fluoride, carbonyl fluoride, sulfonate ester, and carboxylate ester, comprising: dissolving said polymeric material in at least one solvent selected from the group consisting of low molecular weight polymers of perhalogenated alkylethers, low molecular weight polymers of perhalogenated alkyls and perfluorokerosenes, each having boiling points between about 200° C. and 350° C.; shaping said dissolved polymeric material; and thereafter stripping said solvent therefrom to resolidify said polymeric material in the shaped form.

2. The method as stated in claim 1 wherein said other monomer is $CF_2\!=\!CFOCF_2CF(CF_3)O(CF_2)_2SO_2Y$ and Y is fluorine or lower alkoxy.

3. The method as stated in claim 1 wherein said other monomer is $CF_2\!=\!CFOCF_2CF(CF_3)O(CF_2)_2CO_2R$ and R is lower alkyl.

4. The method as stated in claim 1 wherein said other monomer is $CF_2\!=\!CFOCF_2CF(CF_3)OCF_2CO_2R$ and R is lower alkyl.

5. The method as stated in claims 1, 2, 3, or 4 wherein said fluorinated vinyl compound is tetrafluoroethylene.

6. A method of forming shaped polymeric material polymerized from at least two monomers, one said monomer consisting essentially of at least one fluorinated vinyl compound and said other monomer consisting essentially of at least one monomer of the structure

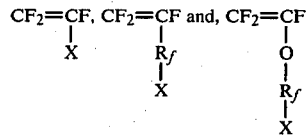

wherein $R_f$ is a bifunctional perfluorinated radical containing from 2 to 8 carbon atoms, which carbon atoms may be interrupted by one or more oxygen atoms and X is selected from the group consisting of sulfonyl fluoride, carbonyl fluoride, sulfonate ester, and carboxylate ester, comprising: dissolving said polymeric material in at least one solvent selected from the group consisting of oligomers and telomers of $-(CF_2-CFCl)_n-$, wherein n is an integer from 5 to 15; shaping said dissolved polymeric material; and thereafter stripping said solvent therefrom to resolidify said polymeric material in the shaped form.

7. The method as stated in claim 6 wherein said other monomer is $CF_2\!=\!CFOCF_2CF(CF_3)O(CF_2)_2SO_2Y$ and Y is fluoride or lower alkoxy.

8. The method as stated in claim 6 wherein said other monomer is $CF_2\!=\!CFOCF_2CF(CF_3)O(CF_2)_2CO_2R$ and R is lower alkyl.

9. The method as stated in claim 6 wherein said other monomer is $CF_2\!=\!CFOCF_2CF(CF_3)OCF_2CO_2R$ and R is lower alkyl.

10. The method as stated in claims 6, 7, 8, or 9 wherein said fluorinated vinyl compound is tetrafluoroethylene.

11. A method of forming shaped polymeric material polymerized from at least two monomers, one said monomer consisting esstentially of at least one fluorinated vinyl compound and said other monomer consisting essentially of at least one monomer of the structure

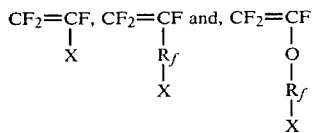

wherein $R_f$ is a bifunctional perfluorinated radical containing from 2 to 8 carbon atoms, which carbon atoms may be interrupted by one or more oxygen atoms and X is selected from the group consisting of sulfonyl fluoride, carbonyl fluoride, sulfonate ester, and carboxylate ester, comprising: dissolving said polymeric material in a solvent consisting of perfluorokerosenes having boiling points between about 200° and 350°; shaping said dissolved polymeric material; and thereafter stripping said solvent therefrom to resolidify said polymeric material in the shaped form.

12. The method as stated in claim 11 wherein said other monomer is $CF_2=CFOCF_2CF(CF_3)O(CF_2)_2SO_2Y$ and Y is fluoride or lower alkoxy.

13. The method as stated in claim 11 wherein said other monomer is $CF_2=CFOCF_2CF(CF_3)O(CF_2)_2CO_2R$ and R is lower alkyl.

14. The method as stated in claim 11 wherein said other monomer is $CF_2=CFOCF_2CF(CF_3)OCF_2CO_2R$ and R is lower alkyl.

15. The method as stated in claims 11, 12, 13, or 14 wherein said fluorinated vinyl compound is tetrafluoroethylene.

16. A method of forming shaped cation exchange resin comprising: dissolving a polymeric material polymerized from at least two monomers, one said monomer consisting essentially of at least one fluorinated vinyl compound and said other monomer consisting essentially of at least one monomer of the structure

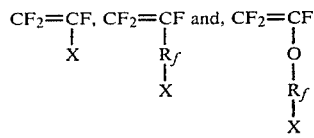

wherein $R_f$ is a bifunctional perfluorinated radical containing from 2 to 8 carbon atoms, which carbon atoms may be interrupted by one or more oxygen atoms and X is selected from the group consisting of sulfonyl fluoride, carbonyl fluoride, sulfonate ester, and carboxylate ester, in at least one solvent selected from the group consisting of low molecular weight polymers of perhalogenated alkylethers, low molecular weight polymers of perhalogenated alkyls and perfluorokerosenes, each having boiling points between about 200° C. and 350° C.; shaping said disssolved polymeric material; stripping said solvent therefrom to resolidify said polymeric material in the shaped form; and thereafter hydrolyzing said resolidified polymeric material.

* * * * *